United States Patent
Negusse

(10) Patent No.: US 9,468,302 B2
(45) Date of Patent: Oct. 18, 2016

(54) ARMREST EXPANSION DEVICE

(71) Applicant: Isaac Negusse, Ashburn, VA (US)

(72) Inventor: Isaac Negusse, Ashburn, VA (US)

( * ) Notice: Subject to any disclaimer, the term of this patent is extended or adjusted under 35 U.S.C. 154(b) by 243 days.

(21) Appl. No.: 14/153,724

(22) Filed: Jan. 13, 2014

(65) Prior Publication Data

US 2014/0217798 A1 Aug. 7, 2014

Related U.S. Application Data

(60) Provisional application No. 61/849,865, filed on Feb. 4, 2013.

(51) Int. Cl.
*A47C 7/54* (2006.01)
*B64D 11/06* (2006.01)
*B60N 2/46* (2006.01)

(52) U.S. Cl.
CPC ............ *A47C 7/543* (2013.01); *B60N 2/4673* (2013.01); *B64D 11/06* (2013.01); *B64D 11/0646* (2014.12); *Y10T 29/49826* (2015.01)

(58) Field of Classification Search
CPC .. A47C 7/543; B64D 11/0646; B64D 11/06; B60N 2/4673
USPC ................. 297/227, 411.23, 411.26, 411.32, 297/411.34
See application file for complete search history.

(56) References Cited

U.S. PATENT DOCUMENTS

| | | | |
|---|---|---|---|
| 1,500,524 A * | 7/1924 | Phillips | A47C 7/543 297/411.34 X |
| 3,634,925 A * | 1/1972 | Van Loo | A47C 7/54 297/227 X |
| 6,547,323 B1 | 4/2003 | Aitken et al. | |
| 6,976,739 B2 | 12/2005 | Wang | |
| 7,185,952 B1 | 3/2007 | Chen et al. | |
| 8,496,290 B2 * | 7/2013 | Maier | B60N 2/206 297/112 X |
| 2009/0250985 A1 | 10/2009 | Maier | |

FOREIGN PATENT DOCUMENTS

| | | |
|---|---|---|
| JP | 10-075847 A | 3/1998 |
| KR | 10-2010-0010428 A | 2/2010 |

OTHER PUBLICATIONS

International Search Report and Written Opinion dated May 23, 2014 from corresponding International Patent Application No. PCT/US2014/014086; 12 pgs.

Chinese Office Action dated Apr. 25, 2016, in connection with corresponding CN Application No. 201480019208.6 (18 pgs., including English translation).

* cited by examiner

*Primary Examiner* — Anthony D Barfield
(74) *Attorney, Agent, or Firm* — Maier & Maier, PLLC

(57) ABSTRACT

An armrest expansion device. The armrest expansion device can include two or more planar housings and couplings for reversibly coupling the device to a pre-existing armrest, for example a commercial passenger vehicle's armrest, or any other desired armrest. At least one of the planar housings may extend the useable area available as an armrest. Further, the armrest expansion device may additionally increase the effective height of the pre-existing armrest.

14 Claims, 13 Drawing Sheets

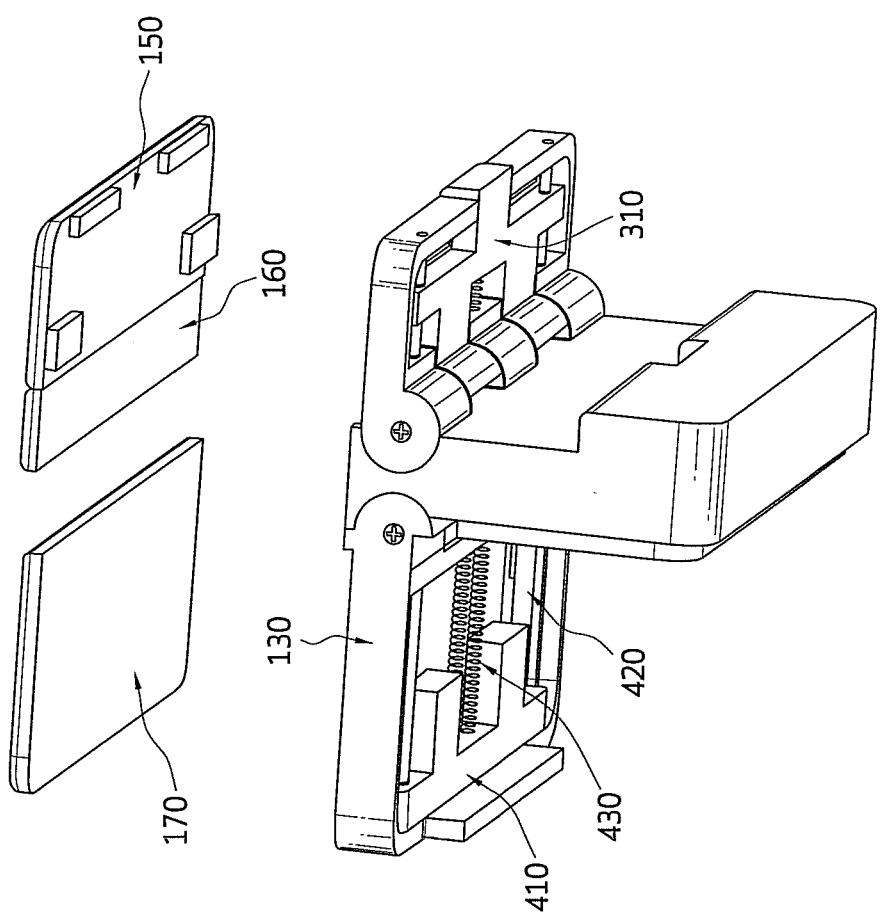

ARMREST EXPANSION DEVICE

CROSS-REFERENCE TO RELATED APPLICATIONS

This application claims priority to U.S. Provisional Patent Application No. 61/849,865 filed Feb. 4, 2013 and entitled ARMREST EXPANSION DEVICE, the entire contents of which are hereby incorporated by reference.

BACKGROUND

Armrests are often inadequate or insufficient in mass transit cabins, such as those found in the coach or economy-classes of most commercial airline aircraft today, especially for passengers seated in an adjacent fashion. Typically in these scenarios, an identically-sized armrest, which is utilized to support passengers seated at the ends of a row of seats (i.e., without the possibility of a passenger being seated next to them on at least one side), is also utilized in between seats where two passengers may be seated immediately next to each other. These passengers will often find it awkward or impossible to share the surface area of the armrest provided and visible signs of passenger discomfort can be easily perceived. Also, these armrests may be require passengers to slouch or lean in order to reach them because of the armrest's inadequate relative height to the passenger's seat.

It is noteworthy that this problem does not typically exist in premium cabins where passengers pay more for additional space. Armrests which separate passengers are typically much larger in all dimensions in these cabins and usually eliminate the need to share a single armrest between passengers. Subsequently, it is assumed that the primary reasons that current technology is insufficient to address the problem have to do with a commercial airline's business goals. Those goals include maximizing the number of passengers, or passenger-seating, within the space of the economy cabins while minimizing the acquisition and maintenance costs of the seating, which is typically installed in the aircraft by a third party. In addition, this problem may also provide airline customers with additional incentives to purchase more comfortable, hence more expensive, seats.

As previously mentioned, the general problem of insufficient armrest space is not unique to aircraft cabins; it may also be found on a variety of commercial vehicles which have been designed for maximum passenger occupancy at the expense of some passenger comfort. Public theaters and viewing venues also commonly present similar problems. Other issues may exist with commercial armrests in general, such as the level of the armrest being lower than would be ergonomically comfortable for a passenger to use, or the armrest surface may be insufficiently soft or padded for a passenger's comfort. These additional issues may be related or unrelated to the primary problem of insufficient space.

SUMMARY

An armrest expansion device may be described herein. The armrest expansion device can include two or more planar housings and couplings for reversibly coupling the device to a pre-existing armrest, for example a commercial passenger vehicle's armrest. At least one of the planar housings may extend the useable area available as an armrest. Further, the armrest expansion device may additionally increase the effective height or user comfort of the pre-existing armrest.

BRIEF DESCRIPTION OF THE FIGURES

FIG. 6a is a bottom, partially-exploded view of an exemplary embodiment.

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage or mode of operation.

Generally referring to the accompanying drawings, an armrest expansion device may be formed in any of a variety of manners and may be used in any of a variety of situations. An exemplary embodiment may appear similar to device 100, although other forms and designs are envisioned. An exemplary situation where the device might be used is on commercial travel vehicles, such as an airplane, where the armrest between two seated passengers is deemed to be insufficient for both travelers to utilize.

Figure 1:
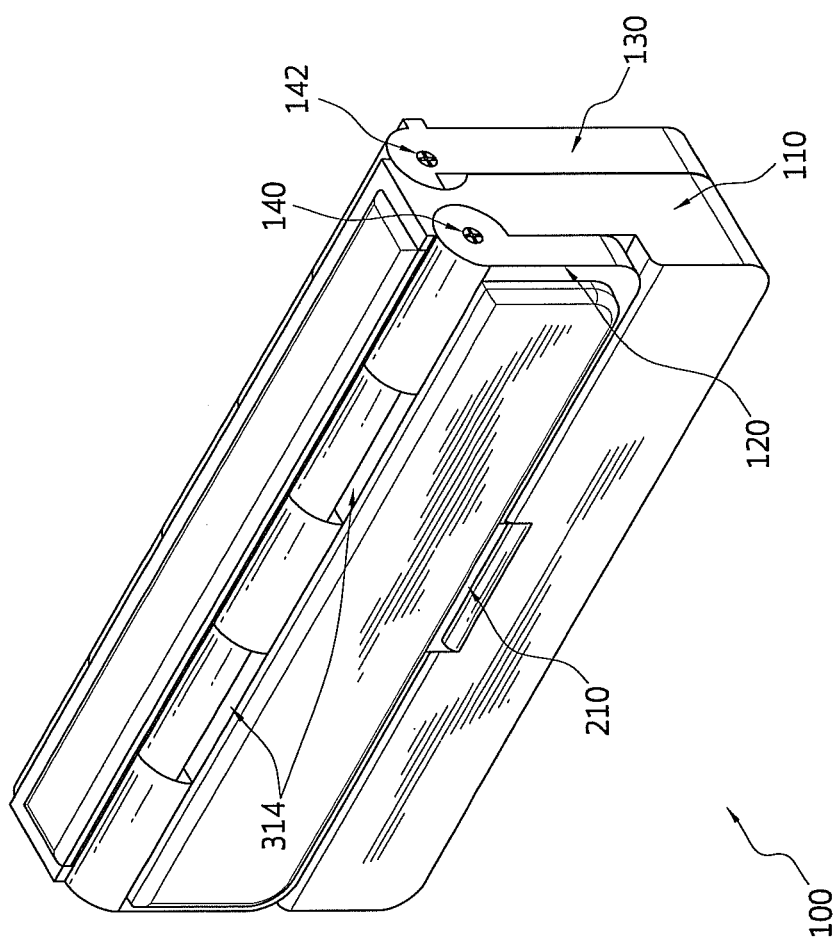
FIG. 1 is a perspective view of an exemplary embodiment in a closed position from the near side.
Figure 2:
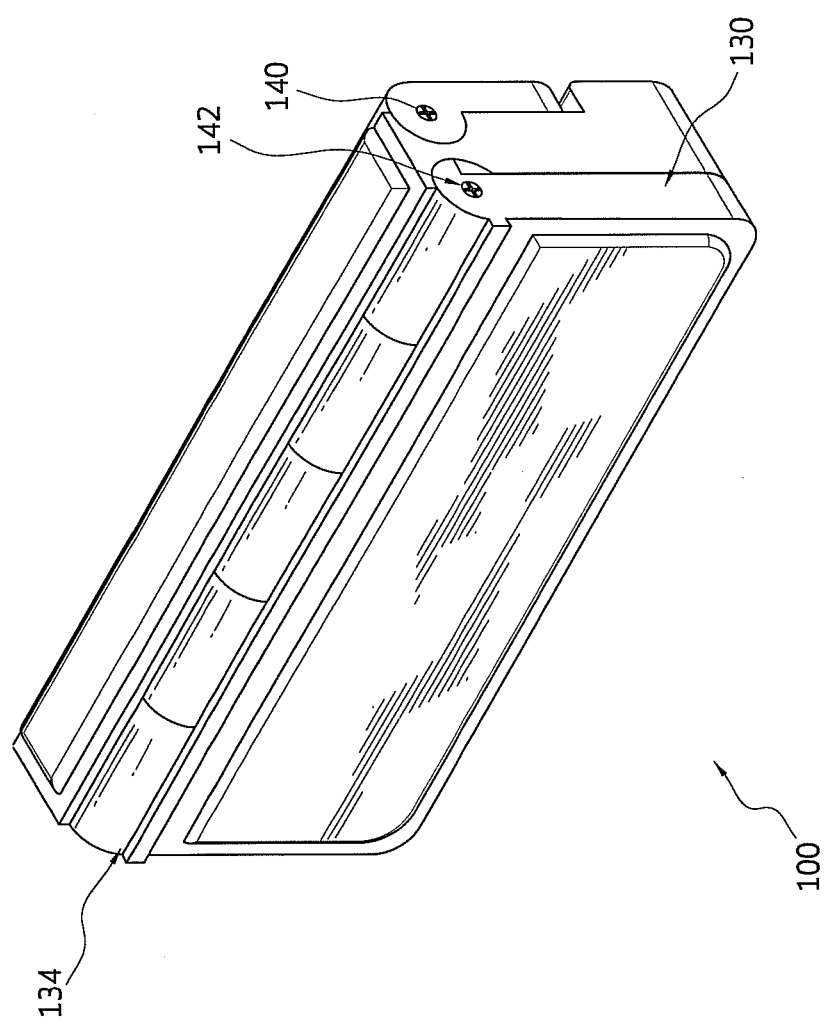
FIG. 2 is a perspective view of an exemplary embodiment in a closed position from the far side.

Referring to exemplary FIG. 1 and exemplary FIG. 2, device 100 may include a middle planar housing 110, a near-side planar housing 120, and a far-side planar housing 130. Middle planar housing 110 may be coupled to near-side planar housing 120 and far-side planar housing 130 by way of axles 140, 142. Middle planar housing 110, near-side planar housing 120, far-side planar housing 130, and axles 140, 142 may be made of any substantially rigid material, such as rigid plastic or any other material known or used in the art, for example materials which may keep the weight of device 100 low so as to facilitate ease of carrying by a user. Further, device 100 may be formed with any desired materials such that it may be mated with a host armrest without any damage to the host armrest by device 100. Near-side planar housing 120 and far-side planar housing 130 may be in an "open" position when they are substantially perpendicular to middle planar housing 110, as shown in exemplary FIG. 4 and exemplary FIG. 5, and said housings 120 and 130 may be in a "closed" position when they are substantially parallel to middle planar housing 110, as shown in exemplary FIG. 1 and exemplary FIG. 2. Near-side planar housing 120 and far-side planar housing 130 may both be "closed" at the same time, as in exemplary FIG. 1 and exemplary FIG. 2, or may be both be "open" at the same time, as in exemplary FIG. 4 and exemplary FIG. 5, or one may be "open" and one may be "closed," as in exemplary FIG. 3. As discussed in further exemplary embodiments below, device 100 may be used in a variety of configurations, as desired. For example, a far-side portion in exemplary FIG. 3 may be closed whereas a near-side portion may be opened. However, it may be appreciated that any desired configuration or orientation may be utilized, as desired.

Near-side planar housing 120 may include near-side pad 150. Further, middle planar housing 110 may include middle pad 160 and far-side planar housing 130 may include far-side pad 170. Near-side pad 150, middle pad 160, and far-side pad 170 may be somewhat soft to the touch and may be made of cloth, leather, foam, composites, synthetic, or any other material known or used in the art, as desired. Further, near-side pad 150, middle pad 160, and far-side pad 170 may be permanently or reversibly adhered to near-side planar housing 120, middle planar housing 110, and far-side planar housing 130, respectively.

Figure 7A:
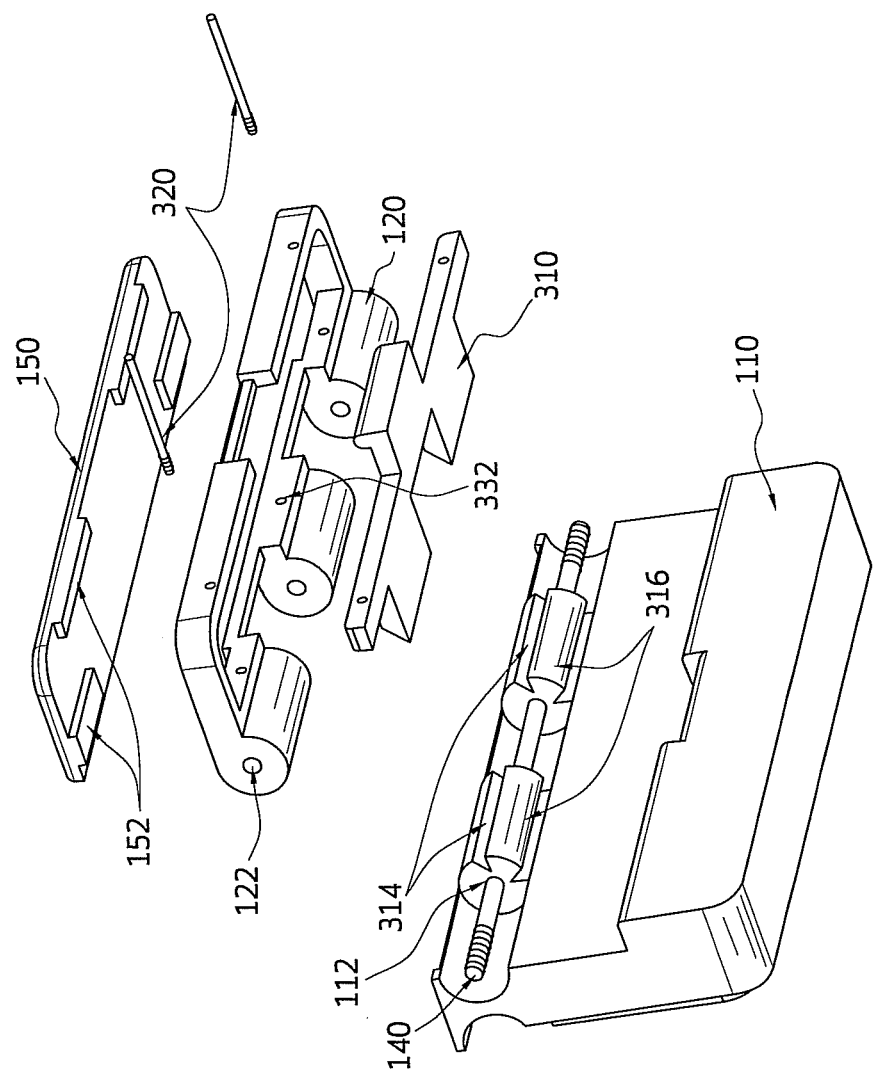
FIG. 7a is an exploded view of the near side of an exemplary embodiment with the spring removed.

Referring to exemplary FIG. 7a, middle planar housing 110 may include one or more notched axle receivers 112 and near-side planar housing 120 may include one or more near-side axle receivers 122. Notched axle receivers 112 and near-side axle receivers 122 may have a bore running substantially parallel to the long axis of device 100 and may have substantially the same diameter as axle 140. This can allow axle 140 to pass through both the bores of notched axle receivers 112 and near-side axle receivers 122 simultaneously. Referring to exemplary FIG. 8a, middle planar housing 110 may include one or more cut axle receivers 114 and far-side planar housing 130 may include one or more far-side axle receivers 132. Cut axle receivers 114 and far-side axle receivers 132 may have a bore running substantially parallel to the long axis of device 100 and may have substantially the same diameter as axle 142. As above, this can allow axle 142 to pass through both the bores of cut axle receivers 114 and far-side axle receivers 132 simultaneously. Axles 140, 142 may be secured in their respective bores using any desired method, including but not limited to bolting threaded ends of the axles to the planar housings or utilizing a torque force to screw threading on the axles into their housings.

Figure 3:
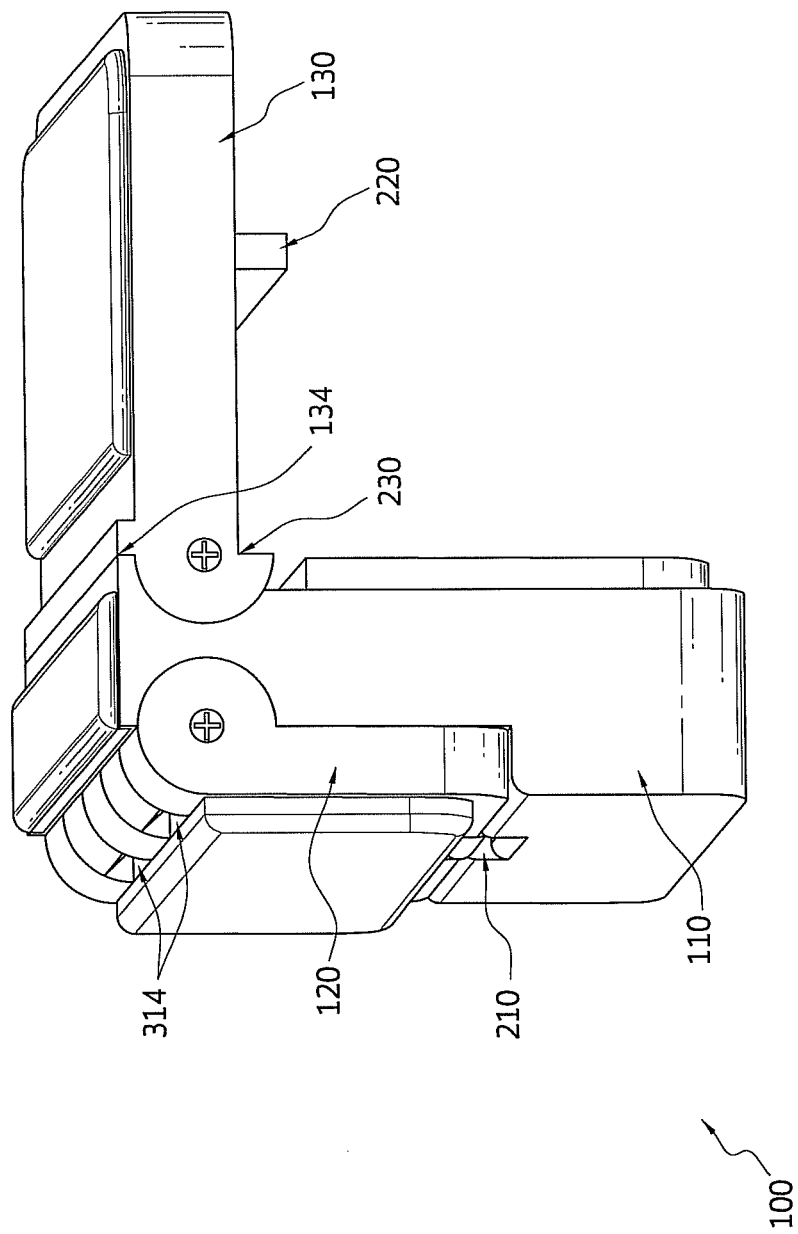
FIG. 3 is a low-angle perspective view of an exemplary embodiment in a partially open position.

As shown in exemplary FIGS. 2 and 3, far-side planar housing 130 may further include ridge 134. Ridge 134 may be of sufficient size to arrest further rotational motion around axle 142 when far-side planar housing 130 becomes substantially perpendicular to middle planar housing 110, for example, in its "open" position, as shown in exemplary FIG. 5.

Referring now to exemplary FIG. 1 and exemplary FIG. 3, near-side planar housing 120 may include unlocking tab 210. Unlocking tab 210 may be used to functionally unlock near-side planar housing 120 from either of the "closed" or "open" positions, as described in further detail below.

Figure 4:
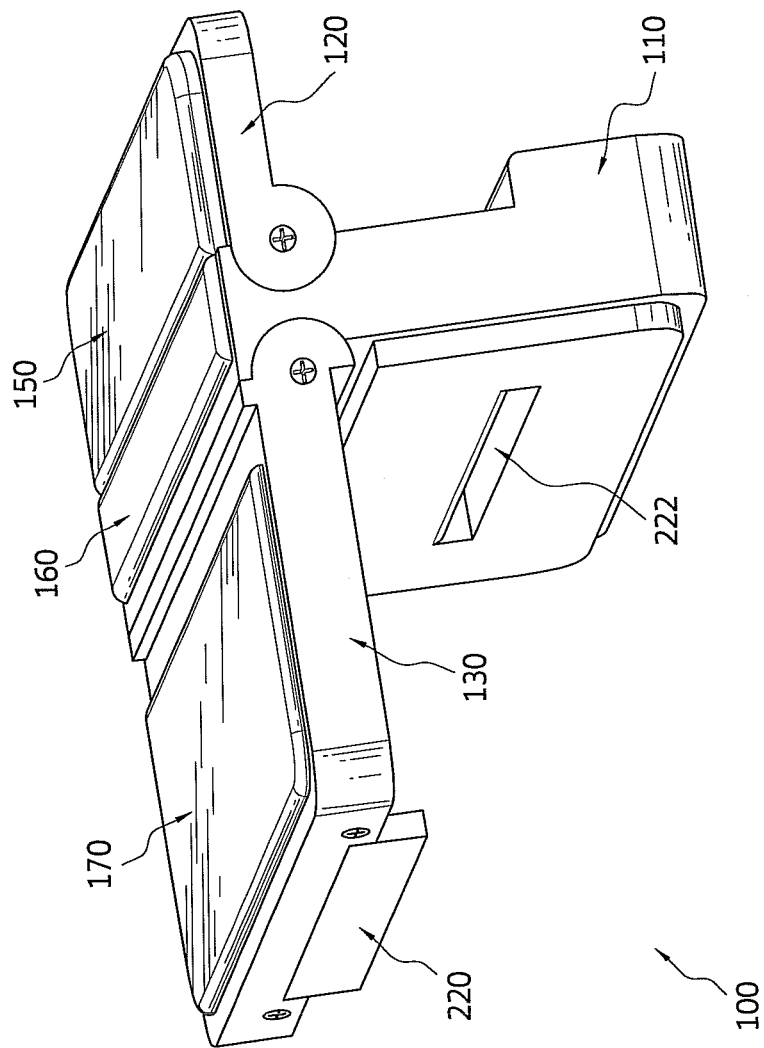
FIG. 4 is a low-angle perspective view of an exemplary embodiment in a fully open position.

In exemplary FIGS. 3 and 4, far-side planar housing 130 may include locking key 220. Locking key 220 may move along far-side planar housing 130 in such a fashion as to customizably fit different sized pre-existing armrests, wherein the top portion of such pre-existing armrests would be received substantially in the space between middle planar housing 110, far-side planar housing 130, and locking key 220. Middle planar housing may include key slot 222, as shown in FIG. 4. Key slot 222 may have dimensions substantially similar to locking key 220 such that locking key 220 may be received by key slot 222 when far-side planar housing 130 is in a "closed" position as shown in exemplary FIG. 2. In a further exemplary embodiment, when far-side planar housing 130 is in a "closed" position, the receiving of locking key 220 inside key slot 222 may provide a small space between middle planar housing 110 and far-side planar housing 130, thereby allowing a user to more easily open far-side planar housing 130 with, for example, a finger or any desired tool.

In another embodiment, far-side planar housing 130 may receive slide locking mechanism 410 in a receiving groove. The receiving groove of far side planar housing 130 may be designed and oriented to allow far-side locking mechanism 410 to glide along guiding rods 420 of far side planar housing 130 a predetermined distance or length. Further, when far-side locking mechanism 410 is located such that locking key 220 is seated inside key slot 222, that is, when far-side planar housing 130 is in the "closed" position, the empty part of the sliding groove may provide a spacing between far-side planar housing 130 and middle planar housing 110 to allow for the use of a finger to open far-side planar housing 130 without the need to pry apart the pieces with difficulty.

Far-side planar housing 130 may have a joint cut 230. Joint cut 230 may have an angle substantially similar to 90 degrees, such that when far-side planar housing 130 is in an "open" position, the angle of joint cut 230 substantially matches the angle between middle planar housing 110 and far-side planar housing 130. As seen in exemplary FIG. 6b and described in more detail below, middle planar housing 110 may also have joint cut 232. Joint cuts 230, 232 may be arranged such that when far-side planar housing 130 is in an "open" position, joint cuts 230, 232 create a substantially continuous angle running along the long axis of device 100 between middle planar housing 110 and far-side planar housing 130.

Figure 5:
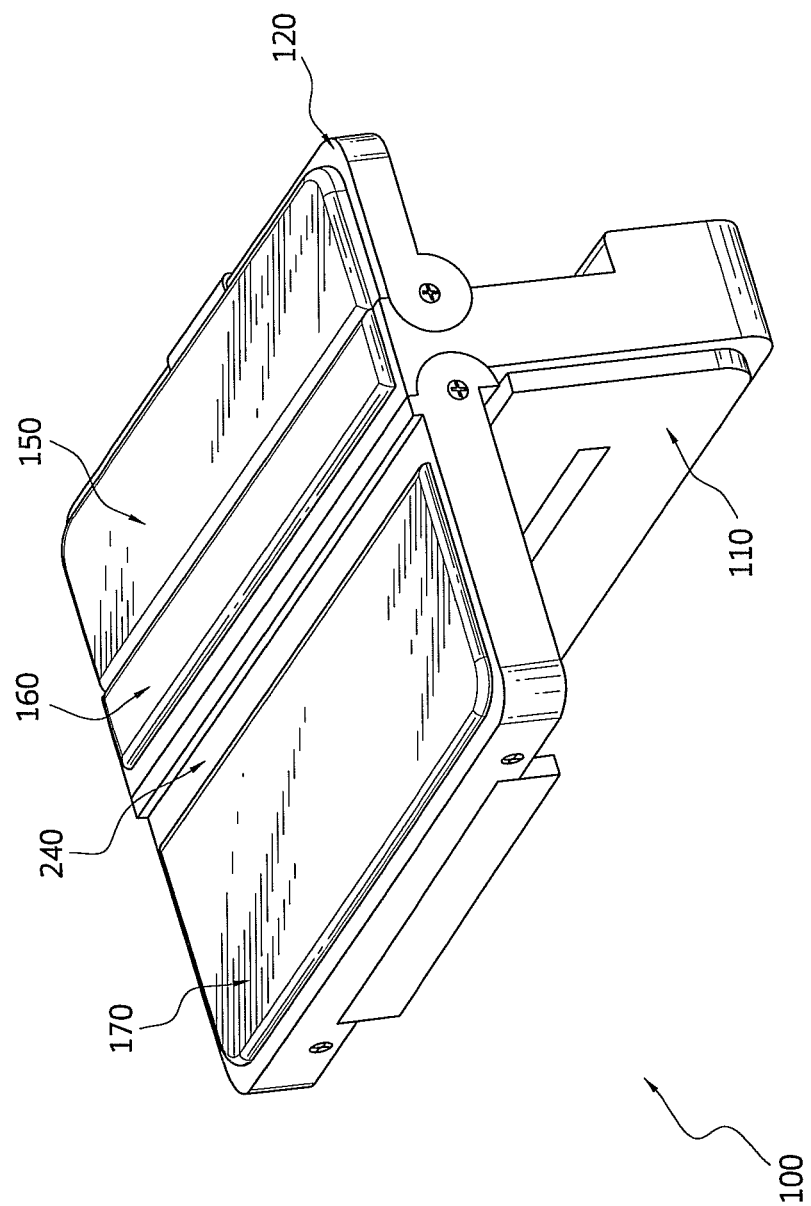
FIG. 5 is a high-angle perspective view of an exemplary embodiment in a fully open position.

Referring now to exemplary FIG. 5, near-side pad 150 and middle pad 160 may, together, be a size substantially similar to far-side pad 170. Alternatively, near-side pad 150 may be narrower or wider, which can allow for near-side planar housing 120 to be correspondingly narrower or wider, which in turn may allow for more or less seat room. A user may utilize combined near-side pad 150 and middle pad 160, allowing another passenger or user to utilize far-side pad 170. Far-side planar housing 130 may include spacing 240 which may serve as a separator between the user's area of use of combined near-side pad 150 and middle pad 160 and another passenger's area of use of far side pad 170.

Referring generally to exemplary FIGS. 6-8, near-side pad 150 may include one or more adhesive tabs 152. In one exemplary embodiment, adhesive tabs 152 may have a thickness of about 0.125 inches.

Figure 6B:
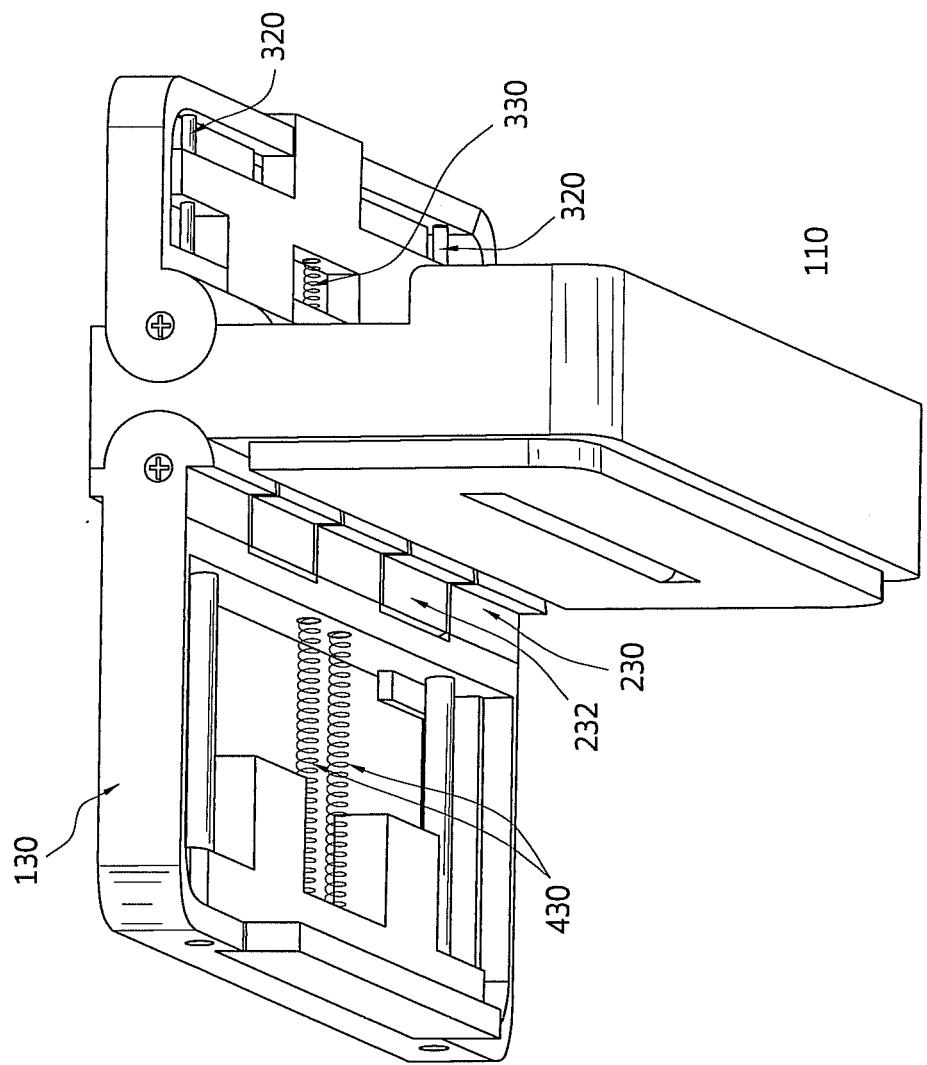
FIG. 6b is a bottom view of an exemplary embodiment.
Figure 7B:
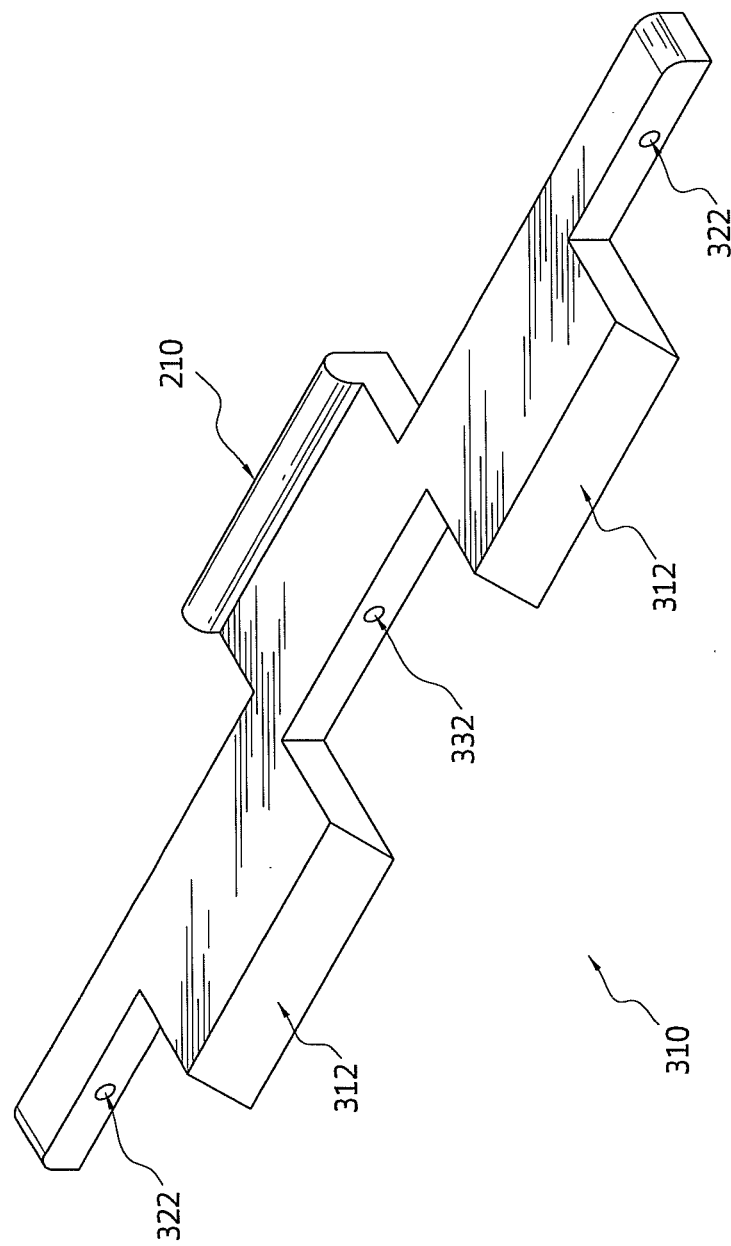
FIG. 7b is a perspective view of an exemplary near-side locking mechanism.

In a further exemplary embodiment, and with reference to exemplary FIG. 6a, near-side planar housing 120 may include near-side locking mechanism 310. One end of near-side locking mechanism 310 may incorporate unlocking tab 210, as shown in FIG. 7b. A second end of near-side locking mechanism may include one or more wedges 312, which may substantially fit into upper notches 314 and lower notches 316 in middle planar housing 110. While wedges 312 can be received by either upper notches 314 or lower notches 316, as shown in exemplary FIG. 7a, near-side planar housing 120 may be substantially locked and fixed in position. Additionally, it may be appreciated that wedges 312 may be wedges in name only insofar as other shapes or designs may be used to substantially fit into upper notches 314 and lower notches 316. Upper notches 314 and lower notches 316 may be oriented and sized such that near-side planar housing 120 may be locked only in the "open" and "closed" positions, as shown in exemplary FIG. 7a, or as desired. Near-side locking mechanism 310 may be coupled to near-side planar housing 120 by way of guiding rods 320 and spring 330, shown in FIG. 6b. Guiding rods 320 and spring 330 may be oriented such that near-side locking mechanism 310 can move substantially within the plane of near-side planar housing 120, as shown in exemplary FIG. 6b. Guiding rods 320 may fit substantially within rod bores 322 such that near-side locking mechanism 310 can glide smoothly along guiding rods 320, as seen in exemplary FIGS. 7a and 7b. Spring 330 may be coupled to near-side locking mechanism 310 and near-side planar housing 120 at spring attachment points 332, as shown in exemplary FIGS. 6b and 7a. Spring 330 may be coupled to near-side locking mechanism 310 and near-side planar housing 120 by hook-head threaded attachment devices or in any other fashion, as desired.

Figure 8A:
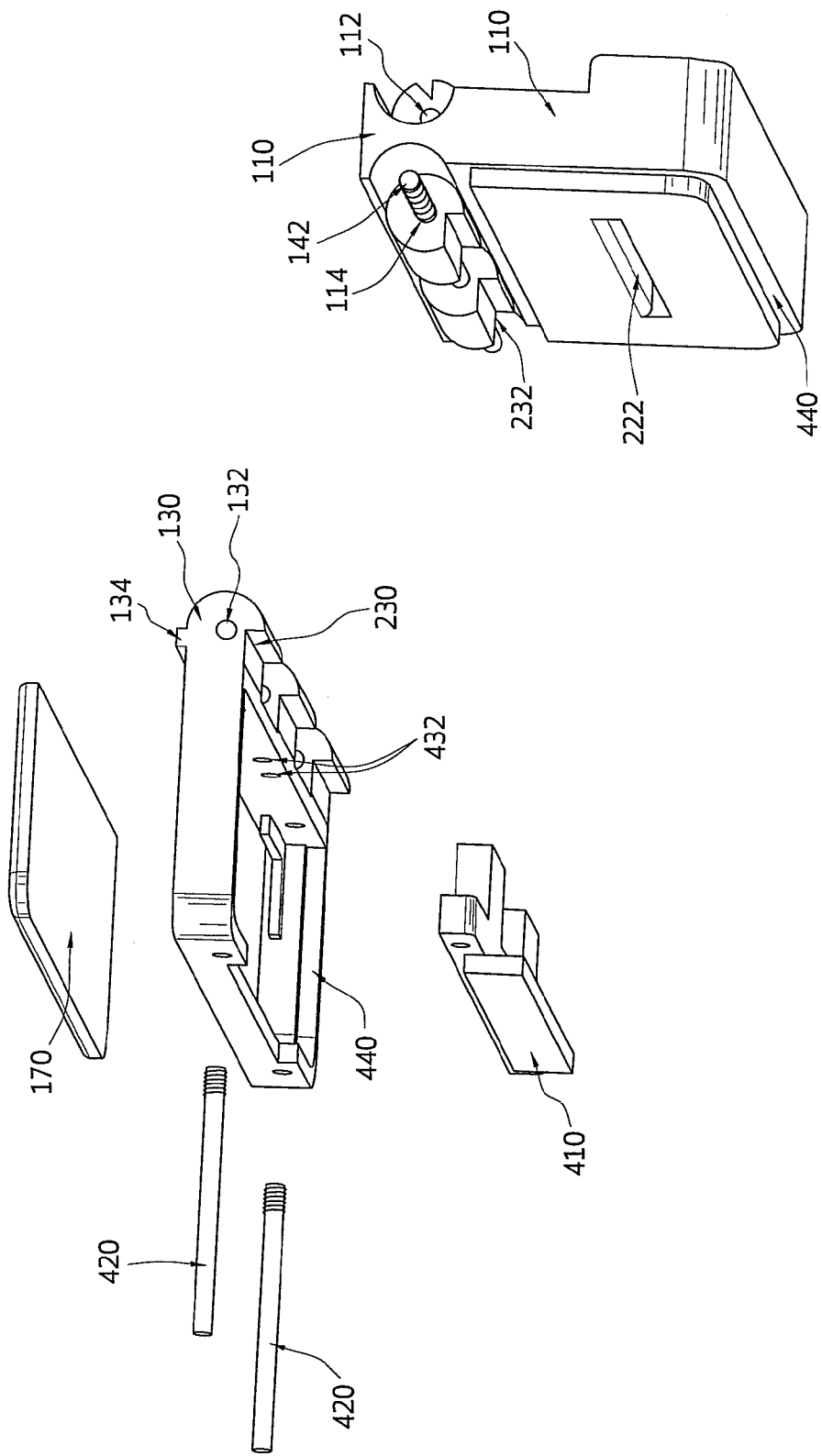
FIG. 8a is an exploded view of the far side of an exemplary embodiment with the springs removed.

Far-side planar housing 130 may include far-side locking mechanism 410, which may incorporate locking key 220, as shown in exemplary FIG. 8a. Far-side locking mechanism 410 may be coupled to far-side planar housing 130 by way of one or more guiding rods 420 and springs 430. Guiding rods 420 and springs 430 may be oriented such that far-side locking mechanism 410 moves substantially within the plane of far-side planar housing 130, as shown in exemplary FIG. 6b. Guiding rods 420 may fit substantially within rod bores 422 such that far-side locking mechanism 410 may glide smoothly along guiding rods 420. Springs 430 may be coupled to far-side locking mechanism 410 and far-side planar housing 130 at spring attachment points 432. Springs 430 may be coupled to far-side locking mechanism 410 and far-side planar housing 130 by hook-head threaded attachment devices or in any other fashion, as desired. Further, springs 430 may have a strength and length such that when far-side planar housing 130 is in the "closed" position and locking key 220 may be received substantially in key slot 222, springs 430 generate a slight friction force to maintain far-side planar housing 130 substantially in the "closed" position. Further, springs 430 have a strength and length such that when far-side planar housing 130 is in the "open" position, locking key 220 may be stretched as far as desired along far-side planar housing 130 so as to allow for spring tension substantially sufficient to grip a commercial vehicle's armrest between locking key 220 and middle planar housing 110.

Figure 8B:
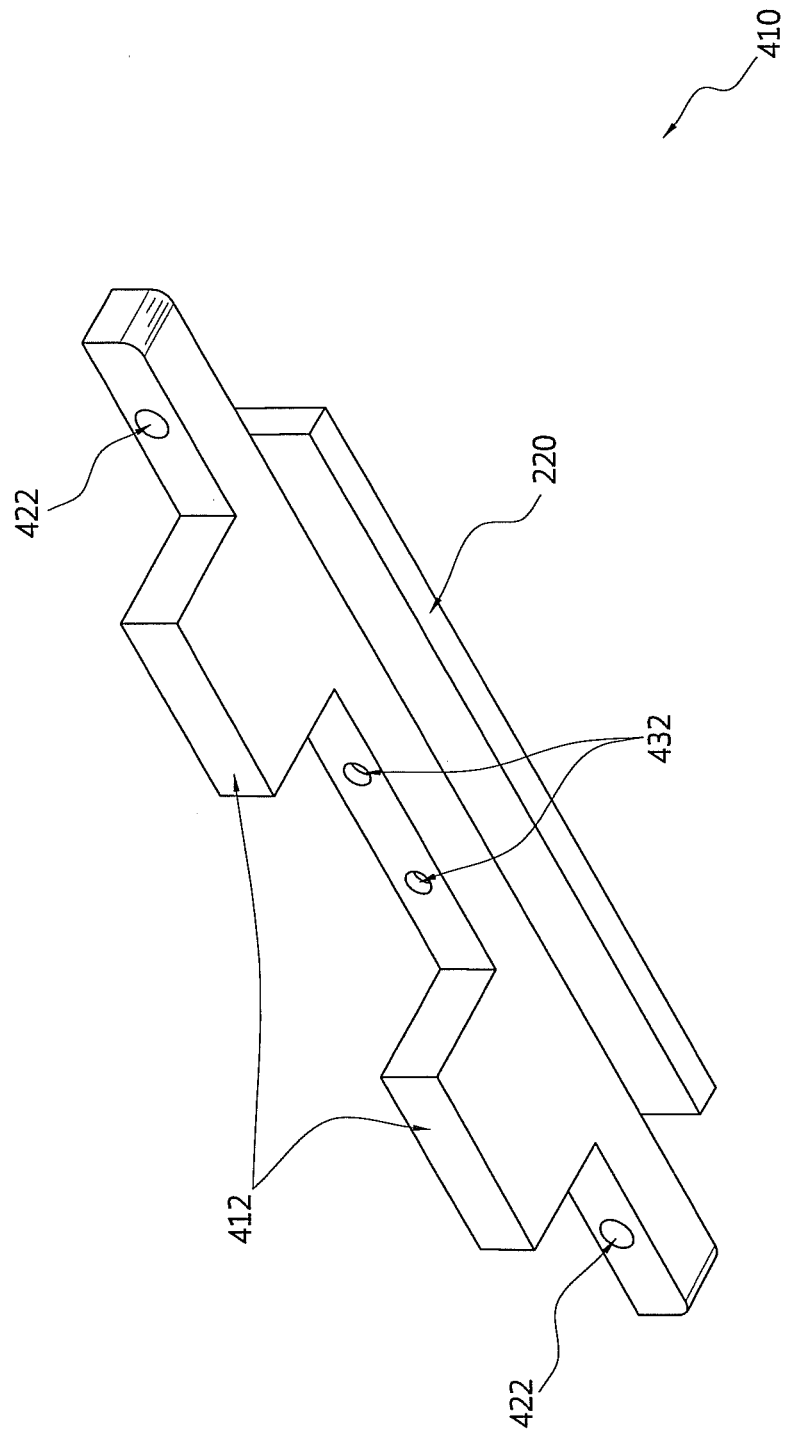
FIG. 8b is an exemplary perspective view of a far-side locking mechanism.

Additionally, in another exemplary embodiment shown in FIG. 8b, far side lock stopper 412 may be shown. Far side lock stopper 412 may be modified in any of a variety of manners without changing the size of the far side planar housing 130. For example, the size of far side lock stopper 412 may be adjusted so as to prevent proximity to axle 142. The adjustability of far side lock stopper 412 may be such that it is built into the structure of far side lock stopper 412, so as to allow a desired range of adjustments without changing out the component. Alternatively, far side lock stopper 412 may be such that it interchangeable with other lock stoppers of different sizes to provide adjustability.

Referring to exemplary FIG. 8a, middle planar housing 110 and far-side planar housing 130 may include spacing 440. Spacing 440 may be of a size to snugly receive far-side planar housing 130 when far-side planar housing 130 is in the "closed" position as shown in exemplary FIG. 2.

In further exemplary embodiments, springs 430 may be slightly extended by about 0.125 inches when device 100 is in the "closed" position and locking key 220 is received by key slot 222. A slight extension of 0.125 inches of springs 430 may generate a force that can hold device 100 "closed" but may also be such that it may be overcome by a user's finger or an application of a similar tool. Further, it is envisioned that far-side locking mechanism 130 may extend about 1.5 inches to a substantially full extension of springs 430 to allow for a tension force to hold device 100 in place upon a commercial passenger vehicle armrest. In one exemplary embodiment, the distance between the "at rest" position of locking key 220 and joint cuts 230, 232 may be about 2.25 inches, which can allow the use of device 100 with any commercial armrest of width between about 2.25 and about 3.75 inches, for example widths between about 3.0 and about 3.75 inches, to allow for the generation of a sufficient or desired tension force in springs 430 and substantially minimize overhang of far-side planar housing 130 beyond a far edge of the commercial host armrest. It may be appreciated, however, that these dimensions and the associated components that allow for fitting and adjustment, may be varied, as desired, in order to provide for any size armrest or other |adjustments|[c1]. In another exemplary embodiment, positioning of the far side planar housing 130 may be such that it covers an entirety of a host armrest, an entire width of a host armrest, or a desired portion of the host armrest. Additionally, other sizes, scaling, and dimensions may be used to accommodate these or other sizes of commercial armrests, as desired.

In one exemplary embodiment, spring 330 may have a stiffness ratio between about 10 and about 20 lbs/in and springs 430 may each have a stiffness ratio between about 20 and about 25 lbs/in. Both springs 330, 430 may have at-rest lengths of about 0.5 inches.

Figure 9:
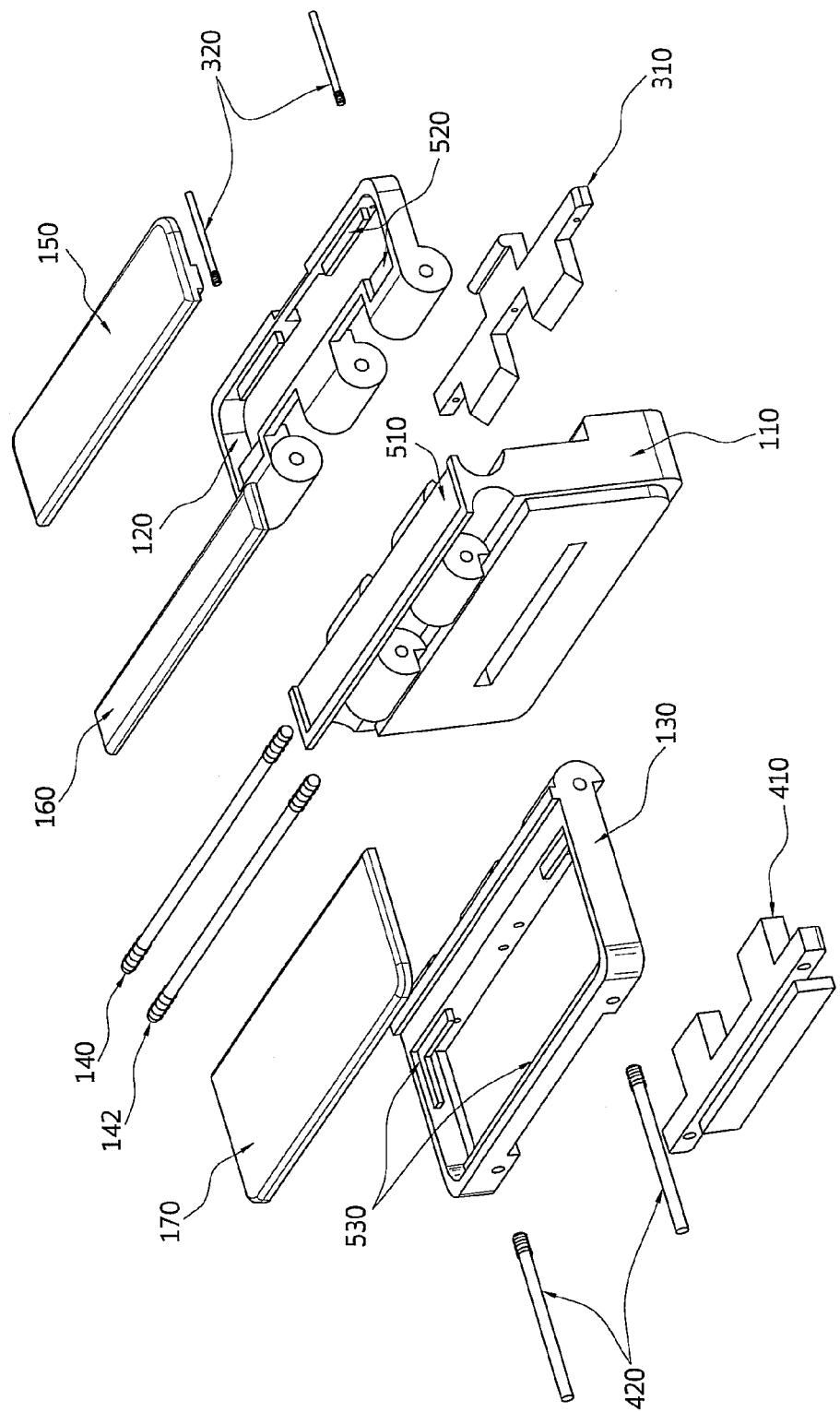
FIG. 9 is a full exploded view of an exemplary embodiment without the springs.

Referring now to exemplary FIG. 9, middle planar housing 110 may include middle pad housing 510. Middle pad housing 510 may be used to couple middle planar housing 110 to middle pad 160. In one exemplary embodiment, middle pad housing 510 may have a depression on the top of middle planar housing 110 with dimensions of about 1×10×0.1 inches.

Near-side planar housing 120 may include near-side pad housing 520. Near-side pad housing 520 may be used to couple near-side planar housing 120 to near-side pad 150. In one exemplary embodiment, near-side pad housing 520 may have tabs extending into the interior of and depressions in near-side planar housing 120. Tabs of near-side pad housing 520 may also extend to a greater or lesser extent into the interior of near-side planar housing 120, as desired. In one exemplary embodiment, the interior space of near-side planar housing 120 above near-side pad housing 520 may have dimensions of about 2×10×0.125 inches.

Far-side planar housing 130 may include far-side pad housing 530. Far-side pad housing 530 may be used to couple far-side planar housing 130 to far-side pad 170. In one exemplary embodiment, far-side pad housing 530 may have tabs which protrude about 0.25 inches into the interior of far-side planar housing 130 and may be located below the surface of far-side planar housing 130 to create a gap of about 0.125 inches between the top of far-side pad housing 530 and the top of far-side planar housing 130. Additionally, far-side pad housing 530 may be wider or narrower or extend throughout the entire interior of far-side planar housing 130, as desired. In one exemplary embodiment, the interior space of far-side planar housing 130 above far-side pad housing 530 may be about 3×10×0.125 inches.

In further exemplary embodiments, any surface on device 100 which is may come in contact with a commercial vehicle's armrest may be covered with a material that creates a high static friction, including but not limited to rubber, silicone, or suction-creating material. Further exemplary embodiments may utilize a sleeve disposed around an armrest that may create a desired couple or protect the armrest, or otherwise prevent damage or marking of the armrest.

Figure 10:
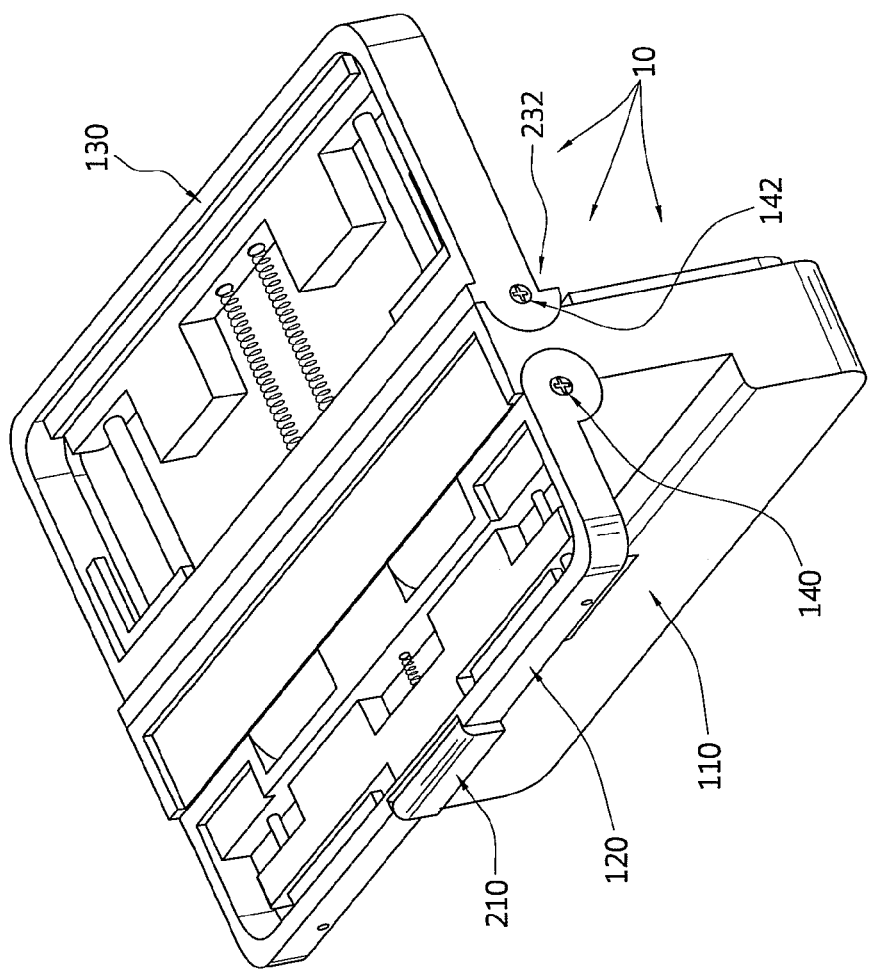
FIG. 10 is side-elevation view of an exemplary embodiment in use with a pre-existing commercial armrest with pads removed.

Referring to the exemplary figures described above and also to exemplary FIG. 10, in the operation of device 100, a user may transport device 100 while in the "closed" position, where middle planar housing 110, near-side planar housing 120, and far-side planar housing 130 may be substantially parallel to each other. In the "closed" position, near-side planar housing 120 may be held substantially in place by near-side locking mechanism 310 by springs 330 keeping wedges 312 substantially seated in lower notches 316; far-side planar housing 130 may be held in place by far-side locking mechanism 410 by springs 430 creating sufficient force to push locking key 220 against the interior of key slot 222 to create a frictional force that substantially holds far-side planar housing 130 in a desired position.

Upon locating a pre-existing armrest 10, a user may open far-side planar housing 130 by swinging up far-side planar housing 130 along axle 142 to the "open" position, pulling locking key 220 along far-side planar housing 130, and seating far-side planar housing 130 upon the pre-existing armrest, allowing springs 430 to pull locking key 220 back to properly seat commercial vehicle's armrest in the space between middle planar housing 110, joint cuts 230 and 232, far-side planar housing 130, and locking key 220. The user may then open near-side planar housing 120 by pulling on unlocking tab 210 to disengage wedges 312 from lower notches 316 and swinging near-side planar housing 120 into the "open" position along axle 140. Once reaching the "open" position, spring 330 may cause wedges 312 to engage with upper notches 314, locking near-side planar housing 120 in place to create an additional armrest space for the user, as shown in exemplary FIG. 10. Placement of device 100 upon a commercial vehicles' pre-existing armrest may additionally increase the effective height of armrest space available to the user, which may be ergonomically preferred.

Other exemplary embodiments may also be envisioned. In one embodiment, upper notches 314 may be extended through near-side planar housing 120 and near-side locking mechanism 310 may be modified to have wedges 312 substantially fit within the expanded notches. This extension of upper notches 314 may increase the force bearable by near-side planar housing 120 while device 100 is in the "open" position.

In another exemplary embodiment, two armrests could be attached about their longest axes by torsion springs, with 180-degree deflection angles, and when folded together, the two armrests could fit into a U-shaped plane, or canal, of semi-rigid material, such as a plastic of a desired thickness to create a the necessary rigidity. When removed from the canal, the two armrests could expand into a parallel configuration through the extension of the springs now unimpeded by the plastic canal. The plastic canal, now empty, could be inverted to attach to the top of a host armrest, utilizing a slight expansion and downward force to mold, or attach to, to the host armrest. Next an attaching mechanism would be required to affix the two parallel armrests to the U-shaped plastic mold that is now attached to the host armrest.

In an additional embodiment, the device may elect not to replace and improve upon the host armrest, perhaps leaving it intact and fully available to the adjacent passenger. Such a design choice may be the consequence of targeting host armrests with airline-provided electronics across the top of said host armrest. One way to accommodate such a design consideration would be to connect to the device to the bottom, typically unused, portion of the airline's armrest and only produce the adjacent new armrest space for the user from this different anchoring vantage point.

What is claimed is:

1. An armrest expansion device, comprising:
a middle planar housing;
a near-side planar housing coupled to the middle planar housing;
a far-side planar housing coupled to the middle planar housing; and
one or more axles that facilitate moving at least one of the near-side planar housing and the far-side planar housing between an open position substantially perpendicular to the middle planar housing, and a closed position substantially parallel to the middle planar housing;
a coupling for reversibly coupling said armrest expansion device to a pre-existing armrest configured to be received between the middle planar housing and a locking key slidably engaged with an underside of the far-side planar housing when in the open position;
wherein at least one of near-side planar housing and far-side planar housing extends the area available as an armrest when in the open position.

2. The armrest expansion device of claim 1 wherein said pre-existing armrest is part of a commercial passenger vehicle.

3. The armrest expansion device of claim 1 wherein said near-side planar housing and said far-side planar housing are coupled to each other by one or more axles.

4. The armrest expansion device of claim 1 wherein the at least one of near-side planar housing and far-side planar housing extends the area available as an armrest on a substantially horizontal plane.

5. The armrest expansion device of claim 1 wherein said near-side planar housing and said far-side planar housing are composed of substantially rigid plastic.

6. The armrest expansion device of claim 1, further comprising a surface coating, said surface coating comprised of a material with a high static friction coefficient.

7. The armrest expansion device of claim 1 wherein the one or more axles rotate said near-side planar housing and said far-side planar housing between the open position and the closed position.

8. The armrest expansion device of claim 1, further comprising a locking mechanism for locking near-side planar housing in an open position.

9. The armrest expansion device of claim 8 wherein the locking mechanism for locking near-side planar housing in an open position comprises:

a receiving member, comprising one or more notched receivers; and said near-side planar housing, comprising one or more wedges and one or more springs;

wherein said one or more wedges have such size and shape to substantially fit into said notched receivers, and said springs creating sufficient force to keep wedges seated in notched receivers, thereby arresting the motion of said near-side planar housing relative to said receiving member.

10. The armrest expansion device of claim 1, further comprising padding.

11. The armrest expansion device of claim 10 wherein said padding is reversibly coupled to said near-side planar housing and said far-side planar housing.

12. The armrest expansion device of claim 10 wherein said padding is substantially permanently coupled to said near-side planar housing and said far-side planar housing.

13. The armrest expansion device of claim 10, wherein said padding comprises:

a near-side pad, said near-side pad being coupled to said near-side planar housing; and a far-side pad, said far-side pad being coupled to said far-side planar housing.

14. The armrest expansion device of claim 13, further comprising a spacing between said near-side pad and said far-side pad sufficient to differentiate said pads when armrest expansion device is in use.

\* \* \* \* \*